und

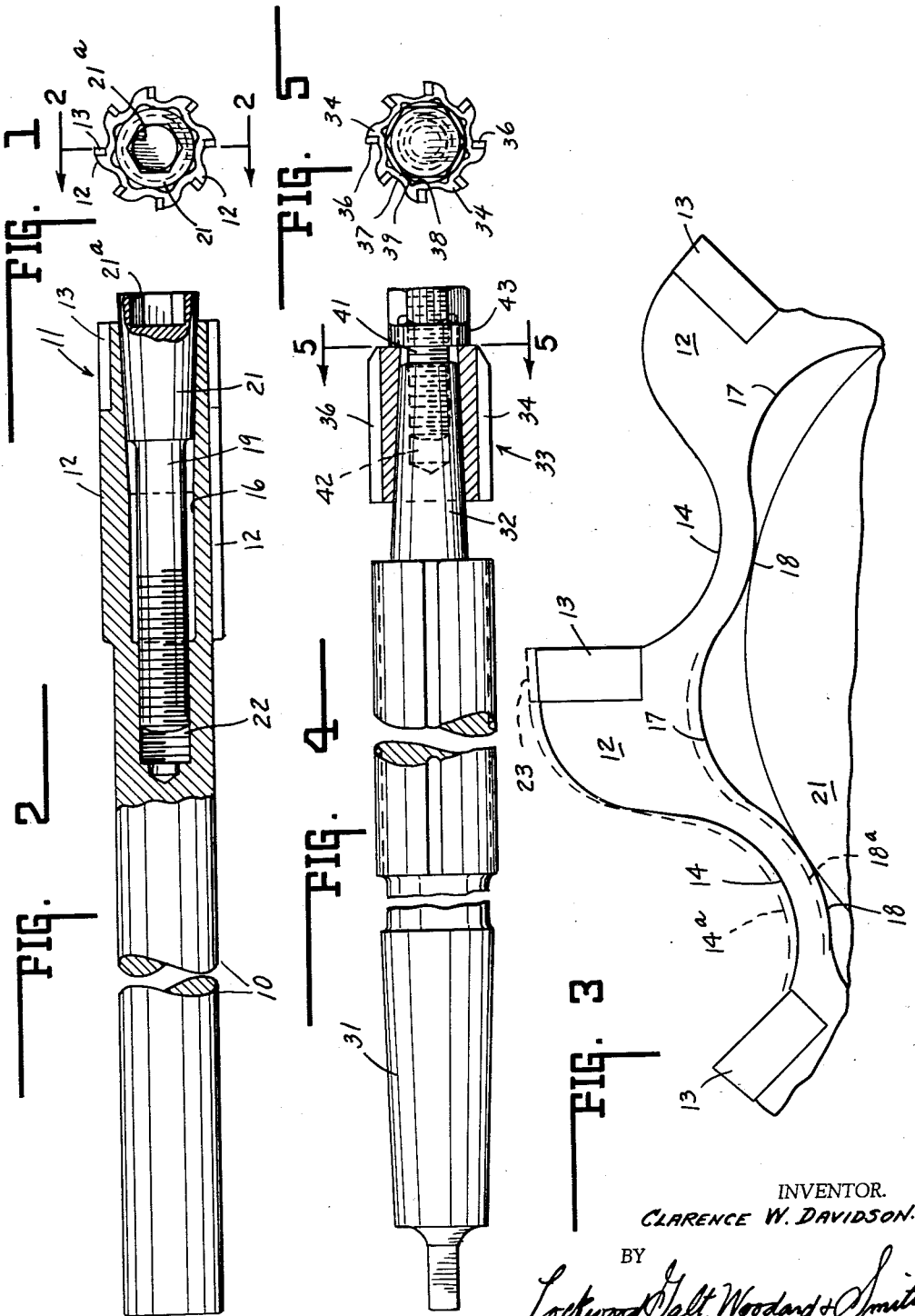

2,983,166
ROTARY CUTTING TOOL

Clarence W. Davidson, 1918 N. Belleview Place,
Indianapolis, Ind.

Filed July 28, 1958, Ser. No. 751,470

4 Claims. (Cl. 77—76)

This invention relates generally to rotary or circular cutting tools and in particular to an expansion type tool which may be adjustably expanded to compensate for wear of its cutting edge.

In working metal, such as finishing circular openings or bores to close tolerance in a piece of stock, it is quite important that the diameter of the cutting head of the tool be maintained. Since wear inevitably occurs in the tool head as the cutting operation proceeds, the tool head must either be constantly replaced or a means must be provided for adjustably expanding the tool to its proper outside diameter. In the application of reamers, for example, it is well known in the prior art to provide a cutting head having flues on its outer surface and accommodating an expansion plug which may be adjustably positioned to deform the cutting head so that the point-to-point diameter of the cutting edges may be maintained to compensate for wear of the head. These prior art devices are invariably formed so that their cutting head is weakened by slotting or are provided with relatively sharp internal corners so that stress concentrations at these points weaken the tool and limit the amount of wear compensating expansion which can be imparted to the tool head.

It is the primary object of the present invention to provide an expansion type cutting tool characterized by an absence of weakening slots and points of stress concentration in the tool head.

It is a further object of the present invention to provide an expansion reamer having a simplified construction and which has a prolonged useful life.

A further object of the present invention is to provide an expansion reamer wherein the external cutting edges or tips are separated by concave arcuate segments or flutes, the inner bore being defined by a series of alternately concave and convex arcuate surfaces whereby adjustable insertion of an expansion plug into the bore uniformly expands the head and repositions the reamer tips.

The full nature of the invention will be understood from the accompanying drawings and the following description and claims:

Fig. 1 is an end view of an expansible reamer embodying the present invention.

Fig. 2 is a side view, partially in section, taken generally along the line 2—2 of Fig. 1.

Fig. 3 is a fragmentary enlarged view of a portion of the reamer shown in Fig. 1.

Fig. 4 is a side view partially in section illustrating the concept of the present invention applied to a shell type reamer.

Fig. 5 is a sectional view taken generally along the line 5—5 of Fig. 4.

Referring initially to Figs. 1, 2 and 3, there is shown a reamer tool having a shank portion 10 and a cutting head 11. It will be understood that the shank portion may be accommodated in a suitable chuck and provided with a rotary motion whereby the cutting head may be utilized to finish off the surface of apertures formed in metal stock.

The end of the tool shank forming the cutting head is provided with spaced, longitudinally-extending teeth 12 which accommodate inserts or tips 13 formed of hardened material such as carbide. As may best be seen in Fig. 3, the teeth are separated by concave arcuate surfaces 14.

The portion of the tool carrying the teeth is provided with a central bore 16, which has approximately the outer half of its length formed to provide an inward taper of approximately 4°. As may best be seen in Fig. 3, the surface of the bore is defined by a series of alternately concave and convex arcuate surfaces indicated at 17 and 18 with the convex surfaces 18 underlying the surfaces 14 and the concave surfaces 17 underlying the teeth 12.

Accommodated within the bore is a threaded expansion plug 19 having an axially tapered portion 21 and a hexagonal recess 21a adapted to accommodate a suitable wrench. The tapered portion is formed so as to closely fit within the tapered section of the bore 16. The inner end of the plug is threaded and accommodated within the threaded aperture 22 extending axially within the tool shank.

In operation, as the tips 13 become worn, it is necessary to reposition the teeth radially outwardly so that the tool will maintain the proper diameter of the aperture being reamed. This may be done by inserting a wrench in the outer end of the expansion plug and turning it further into the threaded aperture 22. This displaces the tapered portion 21 of the expansion plug leftwardly, as viewed in Fig. 2. This displacement of the plug deforms the sectors between the teeth radially outwardly as indicated by broken lines 18a and 14a in Fig. 3. The consequent displacement of the arcuate surfaces indicated at 14 and 18 serves to increase the circumference of the cylindrical cutting head and displaces the tips 13 outwardly as indicated at 23 in Fig. 3. Successive inward displacements of the expansion plug in the bore thus permit repeated adjustments of the position of the cutting tips to compensate for wear thereof under prolonged use. It will be understood that while the expansion plug is shown as being threaded into the tool shank, it may be formed so as to omit the threaded mounting and be driven, by a hammer blow, into the bore of the cutting head.

Referring to Figs. 4 and 5, there is shown an expansion reamer of the shell type embodying the concept of the present invention. The reaming tool is provided with a shank 31 formed to provide an axially tapered arbor 32 thereon. Received upon the tapered arbor portion is a generally tubular shell 33. The shell has formed on its outer surface longitudinally extending teeth 34 which carry hardened inserts or tips 36. The surface of the inner bore of the shell is formed identically to the member shown in Fig. 3, that is, the teeth are separated by concave arcuate surfaces 37. The inner bore of the shell is divided by a series of alternately concave and convex arcuate surfaces, as indicated at 38 and 39, respectively, in Fig. 5. The inner bore of the shell is axially tapered to closely fit on the tapered arbor 32.

A bolt 41 is threaded into an aperture 42 extending axially within the arbor portion 32. The head of the bolt cooperates with a sleeve 43 so that as the bolt is carried into the threaded end of the arbor, the shell is displaced leftwardly as viewed in Fig. 4 along the tapered arbor 32.

In operation, when the cutting tips 36 become worn, the bolt 41 may be adjustably moved further into the aperture 42. The consequent displacement of the shell along the tapered portion 32 results in a displacement of the sectors of the shell between the teeth. As mentioned with reference to Fig. 3, this causes an increase in the circumference of the shell and serves to displace the cutting tips radially outward. Repeated adjustments of the bolt may be made to provide successive outward adjustments of the positions of the cutting tips as they are worn under prolonged use.

It should be noted that in both forms of the invention the concavely formed surface underlying each of the teeth permits sectors between the teeth to be deformed outwardly without stress concentrations, as would be the case if the surface 17 of Fig. 3 extended linearly between the adjoining arcuate surfaces 18. The formation of the inner bore is thus characterized by an absence of corners or relatively sharp bends in the surface of the bore and thus eliminates points of stress concentration. Further, the tool is formed without weakening slots which further adds to its strength and expansion range. Both forms of the reamer embodying the present invention have been described as having a bolt type adjustment, however, it will be understood that, in a simplified form, the expansion plug of Fig. 1 or the shell of Fig. 4 might be adjustably driven, by a hammer blow, to provide the required tool expansion.

While the concept of the present invention has been described as applied to an expansible reamer, it will be understood that it could be applied to other circular cutting tools, such as boring tools, milling cutters or drills.

While the teeth and the flutes therebetween have herein been described as extending axially along the cutting head, it will be understood that they might also be formed so as to have a spiral or helical configuration. When so formed, the bore surfaces would also be formed so as to have a spiral configuration corresponding to the spiral configuration of the teeth, thereby maintaining a uniform wall thickness in the cutting head.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. In a rotatable cutting tool, a cylindrical shell having generally longitudinally extending teeth on its outer surface, hardened tips carried at the apex of said teeth, the surface of the inner bore of said shell being axially tapered and formed by a series of continuous, alternately concave and convex arcuate surfaces which extend axially the entire length of said teeth, the teeth on the outer surface of said shell being separated by concave arcuate surfaces which overlie and are coextensive with the convex arcuate surfaces in said bore, the concave surfaces of said bore underlying and being coextensive with said teeth, each concave surface on the outer surface of said shell and its adjacent convex surface at the inner bore thereof being arcs of concentric circles in cross-section, an axially tapered expansion plug adapted to be received within said bore, and means for adjustably positioning said plug within said bore whereby the sectors of said shell between said teeth may be deformed to increase the circumference of said shell and thereby uniformly displace said tips radially outward.

2. In a rotatable cutting tool, a cylindrical shell having teeth on its outer surface, the surface of the inner bore of said shell being axially tapered and formed by a series of continuous, alternately concave and convex arcuate surfaces which extend axially the entire length of said teeth, the teeth on the outer surface of said shell being separated by concave arcuate surfaces which overlie and are coextensive with the convex arcuate surfaces in said bore, the concave surfaces of said bore underlying and being coextensive with said teeth, each concave surface on the outer surface of said shell and its adjacent convex surface at the inner bore thereof being arcs of concentric circles in cross-section, an axially tapered expansion plug adapted to be received within said bore, and means for adjustably positioning said plug within said bore whereby the sectors of said shell between said teeth may be deformed to increase the circumference of said shell and thereby uniformly displace said teeth radially outward.

3. In a rotatable cutting tool such as a reamer or the like, a tool shank formed at one end to provide a hollow cylindrical member, said cylindrical member having generally longitudinally extending teeth on its outer surface, the surface of the inner bore of said cylindrical member being axially tapered and formed by a series of continuous, alternately concave and convex arcuate surfaces which extend axially the entire length of said teeth, the teeth on the outer surface of said shell being separated by concave arcuate surfaces which overlie and are coextensive with the convex arcuate surfaces in said bore, the concave surfaces of said bore underlying and being coextensive with said teeth, each concave surface on the outer surface of said shell and its adjacent convex surface at the inner bore thereof being arcs of concentric circles in cross-section, an axially tapered expansion plug adapted to be received within said bore, and means for adjustably positioning said plug within said bore whereby the sectors of said shell between said teeth may be deformed to increase the circumference of said cylindrical member and thereby uniformly displace said teeth radially outward.

4. In a rotatable cutting tool such as a reamer or the like, a tool shank, a cylindrical shell having teeth on its outer surface, the surface of the inner bore of said shell being axially tapered and formed by a series of continuous, alternately concave and convex arcuate surfaces which extend axially the entire length of said teeth, the teeth on the outer surface of said shell being separated by concave arcuate surfaces which overlie and are coextensive with the convex arcuate surfaces in said bore, the concave surfaces of said bore underlying and being coextensive with said teeth, each concave surface on the outer surface of said shell and its adjacent convex surface at the inner bore thereof being arcs of concentric circles in cross-section, an axially tapered arbor formed at one end of said tool shank and adapted to be received within said bore, and means for adjustably positioning said shell upon said arbor whereby the sectors of said shell between said teeth may be deformed to increase the circumference of said shell and thereby uniformly displaced said teeth radially outward.

References Cited in the file of this patent

UNITED STATES PATENTS 2,093,742    Staples _____ Sept. 21, 1937

FOREIGN PATENTS 1,018,990    France _____ Oct. 22, 1952